United States Patent Office.

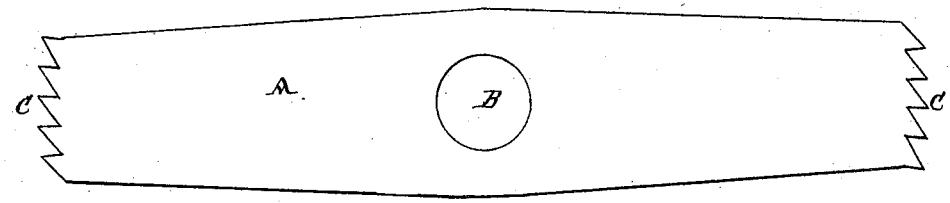
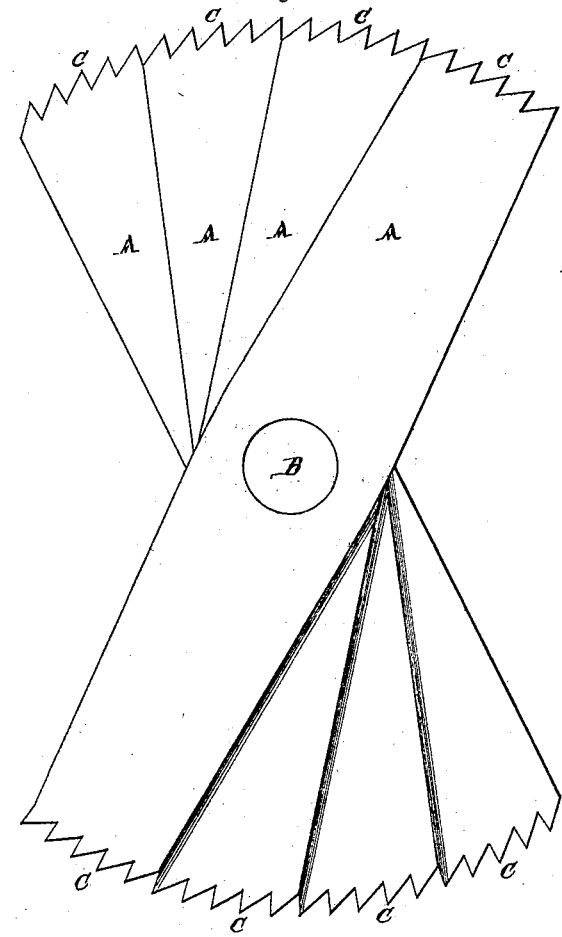

JOSEPH DILL, OF GRAND RAPIDS, MICHIGAN.

Letters Patent No. 110,123, dated December 13, 1870.

IMPROVEMENT IN GROOVING-TOOLS.

The Schedule referred to in these Letters Patent and making part of the same.

*To all whom it may concern:*

Be it known that I, JOSEPH DILL, of Grand Rapids, in the county of Kent and State of Michigan, have invented a new and useful Improvement in Grooving-Tools; and I do hereby declare the following to be a full and correct description of the same sufficient to enable others skilled in the class to which my invention appertains to fully undersand and use the same, reference being had to the accompanying drawing which makes part of this specification, and in which—

Figure 1 is a side view of my improved grooving-tool;

Figure 2 is a side elevation of several of the tools used together to cut a wide groove;

Figure 3 is an end view of fig. 2; and

Figure 4 is an end view of the tool, showing a modification.

Like letters of reference indicate like parts in the several figures.

The nature of my invention consists in constructing a grooving-tool of a piece of suitable metal, having at each end teeth cut in the same direction, the line of the edges of the teeth forming segments of a circle, of which the length of tool is the diameter.

In the center of the tool is formed an opening, made to fit on the shaft or arbor on which it is to be used.

A, in the drawing, represents my improved tool constructed of a suitable piece of metal, of equal width at each end, but increasing in width toward the center, to allow of an opening, B, being made, which is of a size to fit the shaft or arbor on which the tool is to be used.

Each end of the piece A is provided with teeth, C, cut in the same direction, the line of the edges of the teeth forming segments of a circle, of which the length of the tool is the diameter.

Any desired number of these tools may be placed on one shaft, so as to cut a more or less wide groove.

The first great advantage of my tool is that, when several of them are used together, they may be placed on the shaft as shown in fig. 2, so that, although a groove is cut of a width equal to the combined thickness of the number of tools used, (see fig. 3,) yet but one saw-cut is performed; that is to say, each tool has completed its cut before the next one begins to cut, thus requiring no more power than were but one saw used.

Of course one saw could not very well be made of sufficient thickness to cut a groove say one inch wide, and two or three saws would have to be riveted together to do it.

Taking in consideration, not only the great labor of riveting together the saws, but the fact that, once riveted together they are useless for any other purpose but for cutting a groove of that exact width, and the additional power required to drive them, the advantage of my tool will be easily understood, for my tools may be made of varying thickness so as to provide for any width of groove.

Another advantage of my tool is the facility with which the teeth can be filed and kept even. In order to do this it is but necessary to bring all the tools on the shaft in line even with each other, when a file passed between the teeth will file even all the teeth at one end of the tools, the same operation repeated on the other end, fixing the teeth there. Were saws, riveted together, used instead of my tools, the labor of filing the teeth even would be infinitely more troublesome and tedious.

Another advantage of my invention is the perfect smoothness with which the groove is cut. As never more than one tool at the time cuts through the wood, the latter is not torn or splintered, as would be the case were they placed side by side even, as is necessarily the same with saws.

Another advantage of my invention is the cheapness with which it can be applied. Each tool replaces a complete saw, and as each tool can be made for about one tenth of what the saw costs, and as a limited number of tools of different thickness will suffice to produce grooves of any size, varying sometimes only one-sixteenth of an inch, while, for the slightest variation in the width of the groove, a new set of saws would be required, and, as there are certain sizes of grooves which could not possibly be produced by saws, this advantage of my invention will be clearly understood.

In fig. 4 I show a modification in the construction of the teeth, the edges of which may be beveled, so that, when the tool is placed on an inclined shaft, it will cut out the edges of a dovetailed groove.

Having thus described my invention,

What I claim as new, and desire to secure by Letters Patent, is—

The grooving-tool A, constructed and operating substantially as herein shown and described.

JOSEPH DILL.

Witnesses:
BENJAMIN A. WILLIS,
HENRY WHITTAKER, JR.